(12) United States Patent
Ito

(10) Patent No.: US 6,965,490 B2
(45) Date of Patent: Nov. 15, 2005

(54) MULTI-CHANNEL HEAD POSITION CONTROLLING APPARATUS AND METHOD OF CONTROLLING POSITION OF MULTI-CHANNEL HEAD

(75) Inventor: Hiroko Ito, Miyagi (JP)

(73) Assignee: Sony Corporation, Tokyo (JP)

( * ) Notice: Subject to any disclaimer, the term of this patent is extended or adjusted under 35 U.S.C. 154(b) by 48 days.

(21) Appl. No.: 10/611,758

(22) Filed: Jul. 1, 2003

(65) Prior Publication Data

US 2004/0120070 A1    Jun. 24, 2004

(30) Foreign Application Priority Data

Jul. 2, 2002    (JP) .............................. 2002-193225

(51) Int. Cl.[7] .............................................. G11B 5/00
(52) U.S. Cl. ..................................................... 360/76
(58) Field of Search ............................ 360/76, 75, 63, 360/123, 246.6; 156/361

(56) References Cited

U.S. PATENT DOCUMENTS

| | | | |
|---|---|---|---|
| 2,938,962 A | | 5/1960 | Konins et al. |
| 4,305,102 A | * | 12/1981 | Suzuki ..................... 360/246.6 |
| 4,342,057 A | * | 7/1982 | LaBeau et al. ................ 360/76 |
| 4,424,541 A | | 1/1984 | Koinuma et al. |
| 4,460,934 A | * | 7/1984 | Yamada ....................... 360/123 |
| 4,519,006 A | * | 5/1985 | Nakamichi .................... 360/76 |
| 4,539,615 A | | 9/1985 | Arai et al. |
| 4,997,510 A | * | 3/1991 | Shinno et al. ............... 156/361 |
| 5,307,217 A | | 4/1994 | Saliba |
| 5,371,636 A | * | 12/1994 | Nayak et al. .................. 360/75 |
| 5,666,249 A | * | 9/1997 | Ohmori et al. ............. 360/123 |
| 6,141,174 A | * | 10/2000 | Judge et al. ................... 360/76 |
| 6,331,920 B1 | * | 12/2001 | Albrecht et al. .............. 360/63 |

* cited by examiner

Primary Examiner—David Hudspeth
Assistant Examiner—Fred F. Tzeng
(74) Attorney, Agent, or Firm—Robert J. Depke; Trexler, Bushnell, Giangiorgi, Blackstone & Marr

(57) ABSTRACT

A multi-channel head position control apparatus and a method of controlling the position of the multi-channel head in which even if the width of a tape-like recording medium is changed, each of unit recording heads constituting a multi-channel head can be aligned with corresponding track centers. The multi-channel head having a plurality of unit recording heads arrayed in the longitudinal direction is disposed so that the alignment direction of the unit recording heads forms an azimuth angle relative to the running direction of the tape-like recording medium. The position of the multi-channel head is controlled by a supporting section in accordance with a control signal recorded on the tape-like recording medium and detected by a detecting section so that the alignment between each of the unit recording heads and corresponding track center is maintained.

8 Claims, 2 Drawing Sheets

MULTI-CHANNEL HEAD POSITION CONTROLLING APPARATUS AND METHOD OF CONTROLLING POSITION OF MULTI-CHANNEL HEAD

CROSS REFERENCE TO RELATED APPLICATIONS

The present document is based on Japanese Priority Application JP2002-193225, filed in the Japanese Patent Office on Jul. 2, 2002, the contents of which being incorporated herein by reference to the extent permitted by law.

BACKGROUND OF THE INVENTION

1. Field of the Invention

The present invention relates to a multi-channel head position controlling apparatus and a method of controlling position of the multi-channel head. More particularly, the present invention relates to a multi-channel head position controlling apparatus for use in a magnetic recording apparatus for recording via a multi-channel head, control signals, digital data signals and the like on multi-linear recording tracks of tape-like recording media.

2. Description of the Related Art

When control signal, digital data signal and the like are recorded on the multi-linear recording tracks of a tape-like recording medium such as a magnetic tape, a conventional multi-channel head structure is utilized such as the one shown in FIG. 2.

As shown in FIG. 2, unit recording heads 1, 3, 5 are integrally formed into a block in which the unit recording heads 1, 3, 5 are longitudinally arrayed with a predetermined spacing between adjacent heads, thus constituting a multi-channel head 7. This multi-channel head 7 is brought into contact to a tape-like recording medium 9, and the tape-like recording medium 9 is transported. Thus, the control signal, the digital data signal and the like are recorded on a plurality of multi-linear recording tracks (in this figure and hereinafter, they are simply referred to as tracks) TR, TR1, and TR2.

The unit recording heads 1, 3, 5 are disposed so that head gaps 1a, 2a, 3a of the respective unit recording heads 1, 3, 5 are arrayed in a direction perpendicular to the running direction of the tape-like recording medium 9 and the head gaps 1a, 2a, 3a are aligned with the track centers CH1, CH2, CH3 of the respective multi-linear recording tracks TR to TR2.

In FIG. 2, reference HD represents a distance between the unit recording heads 1 to 5 adjacent to each other, and TD a track width of the multi-linear recording tracks TR to TR2.

SUMMARY OF THE INVENTION

In the above-described construction, when each of the unit recording heads 1 to 5 is formed and disposed so that they are aligned with the track centers CH1 to CH3 of the respective multi-linear recording tracks TR to TR2, considerable effort is devoted for accurately aligning the unit recording heads 1 to 5 with the track centers CH1 to CH3. This is because the tape-like recording medium 9 is formed of a thin plastic tape as a base, and if the shape thereof is distorted, in particular, the tape is expanded or contracted in the width direction due to aging or environmental change. Then the distance between the tracks on the tape-like recording medium 9 is also changed, with the result that it becomes difficult to accurately align all of the unit recording heads 1 to 5 with the respective track centers CH1 to CH 3.

For this reason, there is a tendency to cause a so called off-track, leading to difficulty in maintaining accurate servo-control.

Furthermore, if it is requested to improve the track density of the tape-like recording medium 9, then it becomes necessary to coincide the respective unit recording heads 1 to 5 with the track centers CH1 to CH3 of the multi-linear recording tracks TR to TR2. However, when a lot of effort is requested to accurately align the unit recording heads 1 to 5 with the respective track centers CH1 to CH3, to improve the track density also requires limitless effort, with the result that it becomes difficult to realize high-density recording on the tape-like recording medium 9.

In particular, the distance between the unit recording heads at both the ends of the tape-like recording medium 9 can be expressed by "(number of heads−1)×(distance (or spacing) between unit heads)". Therefore, the amount of expansion or contraction can be accumulated at both the ends of the array of the unit recording heads 1 to 5.

The present invention has been conceived so as to alleviate the above-identified problems. Therefore, the present invention provides a multi-channel head position controlling apparatus and a method of controlling position of the multi-channel head in which even if the width of the tape-like recording medium changes, each of the unit recording heads constituting the multi-channel head can be easily aligned with corresponding track centers.

In view the above-identified problems, a preferred embodiment of the present invention provides a multi-channel head position controlling apparatus including: a multi-channel head including a plurality of unit recording heads arranged integrally with a predetermined spacing so as to have head gaps of said unit recording heads aligned with one another, the multi-channel head forming a plurality of multi-linear recording tracks on a tape-like recording medium; a supporting section for supporting the multi-channel head so as to contact with the tape-like recording medium upon forming an azimuth angle relative to the running direction of the tape-like recording medium in which an alignment direction of the unit recording heads crosses the tape-like recording medium at a slant angle, and making the azimuth angle variable; a detecting section for detecting a deviation between a reproducing level of a control record which is previously recorded on the multi-linear recording tracks and a reference level; and a displacement control section for controlling displacement of the supporting section and varying the azimuth angle so as to minimize the deviation, according to the deviation.

According to another preferred embodiment of the present invention, the detecting section may be arranged so as to detect deviation between a reproducing level of the multi-linear recording tracks at both ends of the tape-like recording medium and a reference level.

According to another preferred embodiment of the present invention, the displacement control section controls the supporting section so as to make the supporting section tilt centered on unit recording heads located around a central portion amongst the unit recording heads forming the multi-channel head.

According to still another preferred embodiment of the present invention, there is also proposed a method for controlling a position of a multi-channel head including the steps of: constructing a multi-channel head including a plurality of unit recording heads arranged integrally with a predetermined spacing so as to have head gaps of said unit recording heads aligned with one another, the multi-channel head forming a plurality of multi-linear recording tracks on a tape-like recording medium; arranging the multi-channel head so as to contact with the tape-like recording medium upon forming an azimuth angle relative to the running direction of the tape-like recording medium in which an alignment direction of the unit recording heads crosses the tape-like recording medium at a slant angle, and making the azimuth angle variable; detecting a deviation between a reproducing level of a control record which is previously recorded on the multi-linear recording tracks and a reference level; and controlling displacement of the supporting section and varying the azimuth angle so as to minimize the deviation, according to the deviation.

According to the above-mentioned preferred embodiments of the present invention, since a simple arrangement is provided for supporting the construction and the displacement construction of the multi-channel head, all of the unit recording heads may be easily aligned with the multi-linear recording tracks.

Also, according to the above-described preferred embodiment of the present invention, even if the shape of the tape-like recording medium or the like is changed, the unit recording heads constituting the multi-channel head can be easily aligned with track centers, respectively. Therefore, the multi-channel head may be made free from restrictions in the head arrangement or the track allocation, which are deeply dependent on the rate of expansion or contraction of the tape-like recording medium in the width direction. For this reason, it becomes possible to improve track density.

BRIEF DESCRIPTION OF THE DRAWINGS

The above and other objects, features and advantages of the present invention will become more apparent to those skilled in the art from the following description of the presently preferred exemplary embodiments of the invention taken in conjunction with the accompanying drawings, in which.

DESCRIPTION OF PREFERRED EMBODIMENTS OF THE INVENTION

Figure 1:
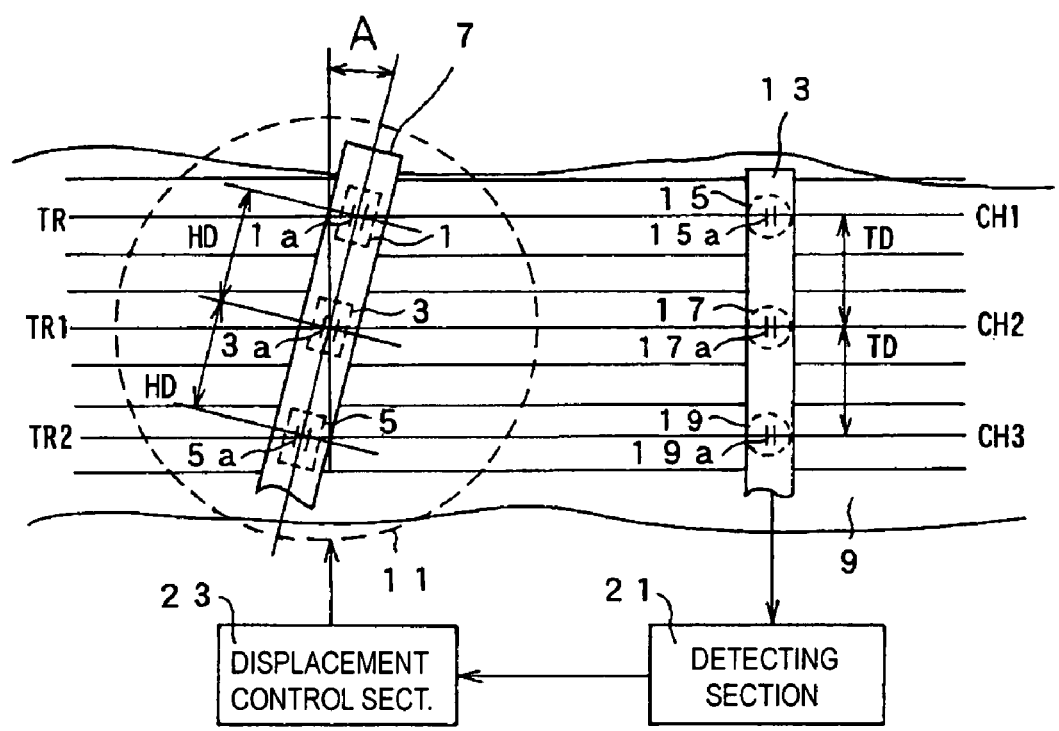
FIG. 1 shows a diagram for describing a multi-channel head position controlling apparatus and a method of controlling the position of the multi-channel head according to a preferred embodiment of the present invention.
Figure 2:
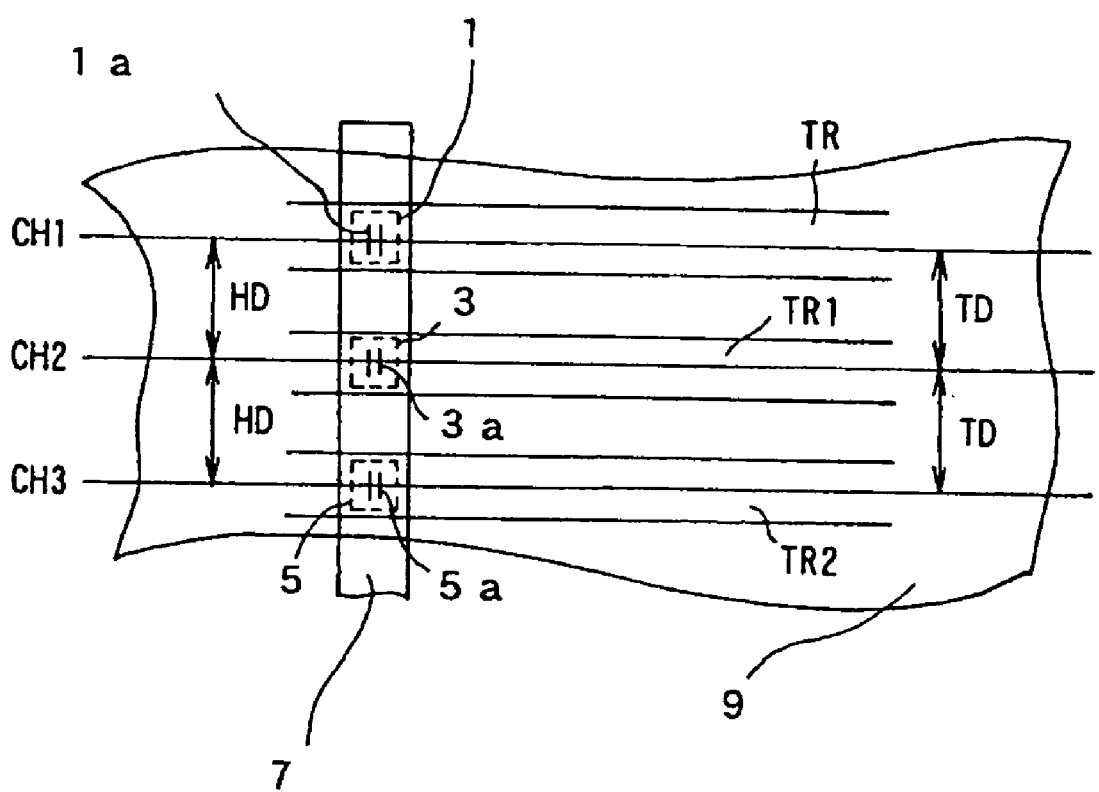
FIG. 2 is a diagram for describing a conventional multi-channel head position controlling apparatus.

Preferred embodiments of the present invention will be hereinafter described with reference to the attached drawings. In the drawings, similar parts corresponding to those of a conventional arrangement will be attached with the same reference numerals and they will not be described in detail.

FIG. 1 is a diagram showing one embodiment of the multi-channel head position controlling apparatus according to the present invention. A method of controlling the position of the multi-channel head will be described together with the description of an operation of the multi-channel head position control apparatus.

As shown in FIG. 1, a multi-channel head 7 is a longitudinally elongated block head having unit recording heads 1, 3, 5, integrally formed with the block in which the unit recording heads 1, 3, 5 are arrayed in the longitudinal direction with a predetermined spacing (distance) between the adjacent unit recording heads, for example. As will be described later on, the block head is brought in contact to a tape-like recording medium 9 at a slant angle A relative to the tape-like recording medium 9.

Each of the unit recording heads 1 to 5 is uniformly shaped and arranged to have substantially the same characteristics. Further, the unit recording heads 1 to 5 are arrayed in the multi-channel head 7 so that the unit recording heads 1 to 5 can be aligned with a plurality of track centers CH1, CH2, CH3 of the multi-linear recording tracks TR, TR1, TR2 which are to be formed on the tape-like recording medium 9. Also, the unit recording heads 1 to 5 are arrayed in the multi-channel head 7 so that the head gaps 1a, 2a, 3a are arrayed in straight line.

According to the above arrangement, a distance (spacing) TD between adjacent tracks of the multi-linear recording tracks TR to TR2 equals to a product of a distance HD between adjacent unit recording heads 1 to 5 multiplied with Cos A. Therefore, the distance TD becomes smaller than the distance HD between adjacent unit recording heads 1 to 5. Also, if the angle A is varied, the distance TD will vary in proportion to the track distance between the adjacent multi-linear recording tracks TR to TR2.

Each of the unit recording heads 1 to 5 is connected with a circuit for supplying the control signal, the digital data signal and the like to be recorded on the tape-like recording medium 9. However, as this circuit component is not a main portion of the present invention, it will be neither described nor illustrated.

The multi-channel head 7 is supported for example by a disc-shaped supporting section 11. The supporting section 11 is fixed to a fixing section, which is not shown. For example, the supporting section 11 is engaged with the fixing section so that the head can be tilted by a small angle around a head gap portion 3a of the center unit recording head 3 shown in the figure in the clockwise and counter-clockwise directions. Further, the supporting section 11 can be fixed to a position at which the displacement can be canceled by the adjustment of the supporting section 11.

In order for the supporting section 11 to handle the adjustment, the multi-channel head 7 is supported so that a so-called azimuth angle A is formed between the array direction of the unit recording heads 1 to 5 and the running direction of the tape-like recording medium 9.

On the upstream side of the running direction of the tape-like recording medium 9 relative to the multi-channel head 7, a detecting head 13 is provided together with predetermined means so that the detecting head 13 perpendicularly crosses the all of the multi-linear recording tracks TR to TR2.

Similarly to the multi-channel head 7, the detecting head 13 is a block head which has unit reproducing heads 15, 17, 19, for example. Each of the unit reproducing heads 15, 17, 19 has a uniform shape and a uniform characteristic and is integrally formed with the block head and arrayed in the longitudinal direction of the block head, whereby the unit reproducing heads 15, 17, 19 are aligned with the multi-linear recording tracks TR to TR2, respectively. Head gaps 15a, 17a, 19a of the unit reproducing heads 15, 17, 19 are arrayed in straight line so that the arrayed in straight line is perpendicular to the lines of the track centers CH1 to CH3. With this arrangement, reproduction is made on the control signal such as a servo-pattern signal which is recorded in advance on the multi-linear recording tracks TR to TR2 of the tape-like recording medium 9 or tracks provided at the vicinities thereof. The unit reproducing heads 15 to 19 are connected to a detecting section 21.

The detecting section 21 is supplied with a reproduced signal from the unit reproducing heads 15 to 19 of the detecting head 13. The detecting section 21 calculates a signal level difference between the reproduced signals of the unit reproducing heads 17 and 15 or the reproduced signals of the unit reproducing heads 15 and 19. In this way, the detecting section 21 detects deviation between a reference level set in advance and the signal level difference. The detected deviation is supplied to a displacement control section 23 that is connected to the detecting section 21.

The detecting section 21 generates a deviation signal to the displacement control section 23 in such a manner that when the signal level difference between the reproduced signal level and the reference level is smaller than the reference signal and the width is expanded with respect to the reference width, then a minus deviation signal corresponding to the level is generated while when the signal level difference is larger than the reference level and the width is contracted with respect to the reference width, then a plus deviation signal corresponding to the level is generated, for example.

In other words, the detecting section 21 responds to the difference between the reproduced signal level and the reference level for generating the deviation signal so as to minimize the difference therebetween.

The displacement control section 23 is a section responding to the detected deviation for effecting slight rotational displacement (tilt) control on the supporting section 11 which supports the multi-channel head 7. For example, if the displacement control section 23 is supplied with a minus deviation signal, then the displacement control section 23 responds to the detected deviation for controlling the supporting section 11 so that the supporting section 11 tilts in the counterclockwise direction. Conversely, if the displacement control section 23 is supplied with a plus deviation signal, then the displacement control section 23 responds to the detected deviation for controlling the supporting section 11 so that the supporting section 11 tilts in the clockwise direction.

In other words, the displacement control section 23 responds to the deviation for controlling the supporting section 11 in its displacement so as to minimize the deviation. Thus, the azimuth angle A is variably controlled.

Now, operation of the above-described multi-channel head position control apparatus 7 according to the present invention will be hereinafter described.

The multi-channel head position control apparatus is placed in an initial condition that, if the tape-like recording medium 9 has a width of a standard product, the unit recording heads 1 to 5 are aligned with the track centers CH1 to CH5 of the multi-linear recording tracks TR to TR2, respectively, and the displacement control section 23 controls displacement of the supporting section 11 so that the multi-channel head 7 forms a standard azimuth angle A. Therefore, the displacement control section 23 will generates no significant deviation signal or a very small one.

Under this condition, if the tape-like recording medium 9 suffers distortion causing width expansion, then the detecting section 21 generates to the displacement control section 23 the deviation signal which corresponds to the difference between the reproduced signal level of the unit reproducing heads 15, 19 and the reference level.

The displacement control section 23 responds to the deviation signal to control the supporting section 11 so that the supporting section 11 tilts in the counterclockwise direction. Thus, the track width is expanded to have a width that is determined by calculation on the distance HD between the unit recording heads 1 to 5, with the result that the unit recording heads 1 to 5 are aligned with the track centers CH1 to CH3 of the multi-linear recording track TR to TR2, respectively.

On the other hand, if the width of the tape-like recording medium 9 is reduced, then the displacement control section 23 responds to the deviation to control the supporting section 11 so as to tilt in a clockwise direction. Thus, the track width is contracted to have a width that is determined by calculation on the distance HD between the unit recording heads 1 to 5, with the result that the unit recording heads 1 to 5 are aligned with the track centers CH1 to CH3 of the multi-linear recording track TR to TR2, respectively.

In general, as the expansion rate of the tape-like recording medium 9 in the width direction is of the order of 10 to the power of minus four, even if there is an adjustment in the range of ten to the power of minus 3, the purpose may be achieved.

For example, if the azimuth angle A is set to 10 degrees, the cosine value thereof becomes 0.9848, if the angle 10.15 degrees, the cosine value thereof becomes 0.9843. Thus, the difference therebetween is 0.0005. Accordingly, variation of the azimuth angle A in a range of ±0.15 provides an allowable correction range of ±0.0005. Further, the larger the azimuth angle A, larger the allowable correction range (correction rate) will be.

If signal reproduction is made by a reproducing head different from the unit recording heads 1 to 5 of the multi-channel head 7, loss will be possibly brought about due to the difference between the azimuth angle A in the recording mode and the azimuth angle A in the reproducing mode.

However, according to the example under the above-described conditions, the multi-channel head 7 is tilted by an angle range of ±0.15 degrees. Under this condition, the sine value becomes ±0.0026. Supposing the track width TD is 10 $\mu$m, the resulting deviation amount at both ends of the track becomes 10 $\mu$m×0.0026=0.026, which is a value sufficiently small if the shortest wavelength of a signal recorded on the tape-like recording medium 9 is 0.29.

In this case, a range of an order of ten to the power of minus three is prepared as an allowable range necessary for correction. However, an actual value will be a fraction of such value and it becomes clear that the expansion rate is problematic when the track width is set to a range of 10 $\mu$m or less. At this event, as the azimuth loss is remarkably decreased as compared with the above-described calculated value, it follows that the present invention turns out to be more effective for higher track density and narrower track widths.

As described above, according to the arrangement of the multi-channel head position control apparatus according to the preferred embodiment of the present invention, a plurality of unit recording heads 1 to 5 are integrally formed into a block to construct the multi-channel head 7 in which the recording heads are arrayed in the longitudinal direction of the block with a spacing between each pair of adjacent heads, the multi-channel head 7 is supported on the supporting section 11 so that the multi-channel head 7 is brought in contact to the tape-like recording medium 9 with the slant angle A formed relative to the running direction of the tape-like recording medium 9, the detecting head 13 is provided on the upstream side of the running direction of the tape-like recording medium 9 so that reproduction is effected on the control record which is recorded in advance on the multi-linear recording tracks TR to TR2 of the tape-like recording medium 9, the detecting section 21 is arranged to detect the deviation based on the difference between the reproduced signal supplied from the unit reproducing heads 15 to 19 of the detecting head 13 and the predetermined reference signal, and the displacement control section 23 responds to the detected deviation for effecting slight rotational displacement control on the supporting section 11 which supports the multi-channel head 7.

As a result, each of the unit recording heads 1 to 5 may be aligned with the track centers CH1 to CH3 of the multi-linear recording tracks TR to TR2 in accordance with the variation of the tape-like recording medium 9 in the width direction. Even if the tape-like recording medium 9 has a change in the width direction thereof, the track deviation caused by the dimension change can be detected, and the unit recording heads 1 to 5 constituting the multi-channel head 7 can be easily aligned with the track centers CH1 to CH3, respectively. Accordingly, accurate servo-control and a higher recording density on the tape-like recording medium 9 may become easier to realize.

In particular, according to the above arrangement, deviation between reproduction level of the multi-linear recording tracks TR to TR2 at both the ends on the tape-like recording medium 9 and the standard level is detected and as the displacement control section 23 controls displacement of the supporting section 11, it becomes possible to align the unit recording heads 1 to 5 with all multi-linear recording tracks TR to TR2.

Further, as the displacement control section 23 controls the supporting section 11 to tilt the multi-channel head 7 centered in the unit recording head 3 at the center of the unit recording head array of the multi-channel head 7 or the vicinity thereof, it becomes possible to provide correction with a simple arrangement.

Furthermore, the tape-like recording medium 9 tends to expand from the center portion thereof to both edge portions in the width direction. Therefore, if the multi-channel head 7 has its tilt controlled centered around the unit recording head 3 at the center of the unit recording head array of the multi-channel head 7, it becomes possible to align the unit recording heads 1 to 5 with all of the multi-linear recording tracks TR to TR2 including the multi-linear recording tracks TR and TR2 at both the ends thereof.

While in the arrangement of the preferred embodiments of the present invention the tilt control on the multi-channel head 7 is effected by tilting around the unit recording head 3 as the center of the unit recording head array of the multi-channel head 7, the present invention is not limited thereto. For example, the tilt center may be set to end unit recording heads 1 or 5 or vicinities thereof so that the tilt control on the multi-channel head 7 is effected by a swingable (or, fun-like or still wiper-like) tilt of the multi-channel head 7.

Further, while in the above-described arrangement the detecting head 13 is disposed on the upstream side of the running direction of the tape-like recoding medium 9 with respect to the multi-channel head 7 so that the tilt control on the multi-channel head 7 is effected directly in response to the reproduced signal read by the detecting head 13, the detecting head 13 may be disposed on the downstream side with respect to the multi-channel head 7 so that the tilt control on the multi-channel head 7 is effected based on the reproduced signal which is supplied in a feed-back manner.

Moreover, a method of controlling the position of the multi-channel head according to the present invention may be summarized by the multi-channel head 7 arranged to have a plurality of unit recording heads 1 to 5 for forming a plurality of multi-linear recording tracks TR to TR2 on the tape-like recording medium 9. The unit recording heads 1 to 5 are integrally formed with the block of the multi-channel head 7 and arrayed with spacing therebetween so that respective head gaps 1a to 5a of the unit recording heads 1 to 5 are arrayed in straight line. The multi-channel head 7 thus constructed is brought in contact to the tape-like recording medium 9 so that the arrayed direction of the unit recording heads 1 to 5 crosses the running direction of the tape-like recording medium 9 at a slant angle, or the azimuth angle. Then, deviation is detected between the predetermined reference level and the reproduced level of the control record which is recorded in advance on the multi-linear recording tracks TR to TR2. Then, controlling is performed in accordance with the detected deviation, for controlling the multi-channel head 7 in its angle and displacement for varying the azimuth angle, so as to minimize the deviation.

As described above, according to the multi-channel head position control apparatus and the method of controlling the position of the multi-channel head of the present invention, the pitch of the multi-linear recording tracks TR to TR2 may be corrected. However, in addition to the correction of pitch of the multi-linear recording tracks TR to TR2, position adjustment of the multi-channel head 7 as a whole may be performed with a structure utilizing generally utilized rack-and-servo mechanisms and also their combinations.

Although examples of preferred embodiments of the present invention have been shown and described in detail, it is needless to say that the present invention is not limited to the above-described embodiments. It is therefore to be understood by those of ordinary skill in the art that any changes, variations, combinations and sub-combinations may be practiced otherwise than as specifically described herein without departing from the scope and spirit of the present invention.

What is claimed is:

1. A multi-channel head position controlling apparatus comprising:

a multi-channel head including a plurality of unit recording heads arranged with a predetermined spacing so as to have head gaps of said unit recording heads aligned with one another, said multi-channel head forming a plurality of multi-linear recording tracks on a tape-like recording medium;

a supporting section for supporting said multi-channel head so as to contact said tape-like recording medium upon forming an azimuth angle relative to the running direction of said tape-like recording medium, and making said azimuth angle variable;

a separate detecting section disposed a pre-determined distance from said multi-channel head in the direction opposite the running direction of said tape-like recording medium for detecting a deviation between a reproducing level of a control record which is previously recorded on said multi-linear recording tracks and a reference level; and a displacement control section for controlling displacement of said supporting section and varying said azimuth angle so as to minimize said deviation.

2. The multi-channel head position controlling apparatus according to claim 1, wherein said detecting section detects deviation between a reproducing level of said multi-linear recording tracks at both ends of said tape-like recording medium and a reference level.

3. The multi-channel head position controlling apparatus according to claim 2, wherein said displacement control section controls said supporting section so as to make said supporting section tilt centered on a central portion amongst said unit recording heads forming said multi-channel head.

4. A method for controlling a position of a multi-channel head comprising steps of:

constructing a multi-channel head including a plurality of unit recording heads arranged with a predetermined spacing so as to have head gaps of said unit recording heads aligned with one another, said multi-channel head forming a plurality of multi-linear recording tracks on a tape-like recording medium;

arranging said multi-channel head so as to contact said tape-like recording medium at an azimuth angle relative to the running direction of said tape-like recording medium, and making said azimuth angle variable;

detecting a deviation between a reproducing level of a control record which is previously recorded on said multi-linear recording tracks and a reference level via a separate detecting section disposed a pre-determined distance from said multi-channel head in the direction opposite the running direction of said tape-like recording medium; and controlling displacement of said supporting section and varying said azimuth angle so as to minimize said deviation.

5. A multi-channel head position controlling apparatus comprising:

a multi-channel head including a plurality of unit recording heads arranged with a predetermined spacing so as to have head gaps of said unit recording heads aligned with one another, said multi-channel head forming a plurality of multi-linear recording tracks on a tape-like recording medium;

a supporting section for supporting said multi-channel head so as to contact said tape-like recording medium upon forming an azimuth angle relative to the running direction of said tape-like recording medium, and making said azimuth angle variable;

a detecting section for detecting a deviation between a reproducing level of a control record which is previously recorded on said multi-linear recording tracks and a reference level, wherein said control record is comprised of at least three tracks; and a displacement control section for controlling displacement of said supporting section and varying said azimuth angle so as to minimize said deviation.

6. A multi-channel head position controlling apparatus as set forth in claim 5, wherein said control record takes up all available tracks on a pre-determined amount of said tape-like recording medium at a beginning portion of the tape.

7. A method for controlling a position of a multi-channel head comprising steps of:

constructing a multi-channel head including a plurality of unit recording heads arranged with a predetermined spacing so as to have head gaps of said unit recording heads aligned with one another, said multi-channel head forming a plurality of multi-linear recording tracks on a tape-like recording medium;

arranging said multi-channel head so as to contact with said tape-like recording medium upon forming an azimuth angle relative to the running direction of said tape-like recording medium, and making said azimuth angle variable;

detecting a deviation between a reproducing level of a control record which is previously recorded on said multi-linear recording tracks and a reference level, wherein said control record is comprised of at least three tracks; and controlling displacement of said supporting section and varying said azimuth angle so as to minimize said deviation.

8. A method for controlling a position of a multi-channel head as set forth in claim 7, wherein said control record takes up all available tracks on a pre-determined amount of said tape-like recording medium at a beginning portion of the tape.

* * * * *